US008548142B2

(12) United States Patent
Hariri et al.

(10) Patent No.: US 8,548,142 B2
(45) Date of Patent: *Oct. 1, 2013

(54) UNIVERSAL POINT OF CONTACT IDENTIFIER SYSTEM AND METHOD

(75) Inventors: Ayman Hariri, Bethesda, MD (US); Scott D. Birnbaum, Bethesda, MD (US)

(73) Assignee: Ayman, LLC, New York, NY (US)

( * ) Notice: Subject to any disclaimer, the term of this patent is extended or adjusted under 35 U.S.C. 154(b) by 1123 days.

This patent is subject to a terminal disclaimer.

(21) Appl. No.: 12/036,793

(22) Filed: Feb. 25, 2008

(65) Prior Publication Data
US 2008/0144791 A1    Jun. 19, 2008

Related U.S. Application Data

(62) Division of application No. 09/873,433, filed on Jun. 5, 2001, now Pat. No. 7,379,543.

(60) Provisional application No. 60/274,208, filed on Mar. 9, 2001.

(51) Int. Cl.
*H04M 3/42* (2006.01)
*H04M 11/00* (2006.01)

(52) U.S. Cl.
USPC .................................. 379/201.01; 379/93.24

(58) Field of Classification Search
USPC ............. 379/201.01–201.03, 201.07–201.08, 379/158, 202.01, 142.01, 245, 88.13, 88.2, 379/93.17, 93.24
See application file for complete search history.

(56) References Cited

U.S. PATENT DOCUMENTS

| | | | |
|---|---|---|---|
| 4,313,035 A | 1/1982 | Jordan et al. | |
| 4,446,294 A | 5/1984 | Rose et al. | |
| 4,677,609 A | 6/1987 | Piereth et al. | |
| 4,734,931 A | 3/1988 | Bourg et al. | |
| 4,837,798 A | 6/1989 | Cohen et al. | |
| 5,239,577 A | 8/1993 | Bates et al. | |

(Continued)

FOREIGN PATENT DOCUMENTS

| EP | 0 531 268 | 3/1993 |
|---|---|---|
| EP | 0531268 A2 | 3/1993 |

(Continued)

OTHER PUBLICATIONS

The Ultimate White Pages, Scott Martin, 1996-2000, 3 pages 125.

(Continued)

*Primary Examiner* — William Deane, Jr.
(74) *Attorney, Agent, or Firm* — Barcelo, Harrison & Walker LLP

(57) ABSTRACT

A subscriber to a universal point of contact service designates a preferred point of contact at which a communication initiator, such as a telephone caller, can contact the subscriber. Such an initiator desiring to contact the subscriber uses the subscriber's email address to establish a communication session with a device associated with the subscriber's preferred point of contact. The subscriber's email address is input to an initiating device, preferably a telephone or facsimile machine, using an entry device capable of entering an email address. A requestor unit, receiving the email address, locates a repository of the subscriber's point of contact information, and requests that information. The repository sends the point of contact information the subscriber has designated as preferred, and the requester unit uses that information to control a telephone switch to establish a communication session between the initiating device and the subscriber's preferred point of contact device.

42 Claims, 8 Drawing Sheets

400

| Preference | Type | Description | Data |
|---|---|---|---|
| | | Universal POC ID | John.Smith@domainname.com |
| | Voice | Home Telephone No. 1 | (202) 555-1234 |
| | Voice | Home Telephone No. 2 | (202) 555-1233 |
| * | Voice | Business Telephone No. 1 | (202) 555-1235 |
| | Voice | Business Telephone No. 2 | (202) 555-1238 |
| * | Fax | Facsimile No. | (202) 555-1236 |
| * | Email | Email Address | John.Smith@domainname.com |
| * | Postal | Business Address | 5555 Wisconson Ave., N.W. Washington, DC 20007 |

(56) References Cited

U.S. PATENT DOCUMENTS

| | | | |
|---|---|---|---|
| 5,243,645 | A | 9/1993 | Bissell et al. |
| 5,452,350 | A | 9/1995 | Reynolds et al. |
| 5,533,115 | A | 7/1996 | Hollenbach et al. |
| 5,555,290 | A | 9/1996 | McLeod et al. |
| 5,608,786 | A | 3/1997 | Gordon |
| 5,625,675 | A | 4/1997 | Katsumaru et al. |
| 5,633,916 | A | 5/1997 | Goldhagen et al. |
| 5,691,973 | A | 11/1997 | Ramstrom et al. |
| 5,742,668 | A | 4/1998 | Pepe et al. |
| 5,742,763 | A | 4/1998 | Jones |
| 5,796,813 | A | 8/1998 | Sonnenberg |
| 5,802,510 | A | 9/1998 | Jones |
| 5,812,865 | A | 9/1998 | Theimer et al. |
| 5,826,036 | A | 10/1998 | Nakagawa et al. |
| 5,826,039 | A | 10/1998 | Jones |
| 5,850,433 | A | 12/1998 | Rondeau |
| 5,862,325 | A | 1/1999 | Reed et al. |
| 6,014,711 | A | 1/2000 | Brown |
| 6,072,862 | A | 6/2000 | Srinivasan |
| 6,104,799 | A | 8/2000 | Jain et al. |
| 6,134,548 | A | 10/2000 | Gottsman et al. |
| 6,173,272 | B1 | 1/2001 | Thomas et al. |
| 6,215,784 | B1 | 4/2001 | Petras et al. |
| 6,243,398 | B1 | 6/2001 | Kahane et al. |
| 6,259,782 | B1 | 7/2001 | Gallant |
| 6,275,490 | B1 | 8/2001 | Mattaway et al. |
| 6,275,575 | B1 | 8/2001 | Wu |
| 6,275,577 | B1 | 8/2001 | Jackson |
| 6,330,308 | B1 | 12/2001 | Cheston, III et al. |
| 6,337,858 | B1 | 1/2002 | Petty et al. |
| 6,337,902 | B1 | 1/2002 | Weir et al. |
| 6,343,119 | B1 | 1/2002 | Creamer et al. |
| 6,343,120 | B1 | 1/2002 | Rhodes |
| 6,373,817 | B1 | 4/2002 | Kung et al. |
| 6,385,646 | B1 | 5/2002 | Brown et al. |
| 6,754,317 | B1 | 6/2004 | Berthoud et al. |
| 7,379,543 | B2 * | 5/2008 | Hariri et al. ............. 379/201.01 |
| 7,484,088 | B2 * | 1/2009 | Campbell et al. ............ 713/156 |
| 2002/0007421 | A1 | 1/2002 | Dixon et al. |
| 2002/0016174 | A1 | 2/2002 | Gibson et al. |
| 2002/0042846 | A1 | 4/2002 | Bottan et al. |
| 2002/0118800 | A1 | 8/2002 | Martinez et al. |
| 2003/0039339 | A1 | 2/2003 | Luehrig et al. |
| 2004/0202299 | A1 | 10/2004 | Schwartz |

FOREIGN PATENT DOCUMENTS

| | | | |
|---|---|---|---|
| EP | 1 011 273 | | 6/2000 |
| EP | 1011273 | A2 | 6/2000 |
| WO | 98/18237 | A1 | 4/1998 |
| WO | WO 98/18237 | | 4/1998 |
| WO | 98/58332 | A1 | 12/1998 |
| WO | WO 98/58332 | | 12/1998 |
| WO | 99/57876 | A1 | 11/1999 |
| WO | WO 99/57876 | | 11/1999 |
| WO | 00/02369 | A1 | 1/2000 |
| WO | WO 00/02369 | | 1/2000 |
| WO | 00/41383 | A1 | 7/2000 |
| WO | WO 00/41383 | | 7/2000 |
| WO | 00/45579 | A1 | 8/2000 |
| WO | WO 00/45579 | | 8/2000 |
| WO | 00/52902 | A1 | 9/2000 |
| WO | WO 00/52902 | | 9/2000 |
| WO | 00/67443 | A2 | 11/2000 |
| WO | 00/69132 | A1 | 11/2000 |
| WO | WO 00/67443 | | 11/2000 |
| WO | WO 00/69132 | | 11/2000 |
| WO | 00/76158 | A1 | 12/2000 |
| WO | WO 00/76158 | | 12/2000 |
| WO | 01/04787 | A2 | 1/2001 |
| WO | WO 01/04787 | | 1/2001 |
| WO | 01/20890 | A1 | 3/2001 |
| WO | WO 01/20890 | | 3/2001 |
| WO | 01/24093 | A1 | 4/2001 |
| WO | 01/24498 | A1 | 4/2001 |
| WO | 01/28186 | A1 | 4/2001 |
| WO | WO 01/24093 | | 4/2001 |
| WO | WO 01/24498 | | 4/2001 |
| WO | WO 01/28186 | | 4/2001 |
| WO | 01/31472 | A1 | 5/2001 |
| WO | 01/35594 | A2 | 5/2001 |
| WO | WO 01/31472 | | 5/2001 |
| WO | WO 01/35594 | | 5/2001 |
| WO | 01/46822 | A1 | 6/2001 |
| WO | 01/47212 | A1 | 6/2001 |
| WO | 01/47231 | A2 | 6/2001 |
| WO | WO 01/46822 | | 6/2001 |
| WO | WO 01/47212 | | 6/2001 |
| WO | WO 01/47231 | | 6/2001 |
| WO | 01/50225 | A2 | 7/2001 |
| WO | WO 01/50225 | | 7/2001 |
| WO | 01/86897 | A1 | 11/2001 |
| WO | WO 01/86897 | | 11/2001 |
| WO | 02/11408 | A2 | 2/2002 |
| WO | WO 02/11408 | | 2/2002 |

OTHER PUBLICATIONS

The Ultimate Email Directory, Scott Martin, 1996-2000, 2 pages.
Frequently Asked Questions, www.theultimates.com, The Ultimates, Scott Martin, 1996-2000, 2 pages.
Virtualplus—Messaging & Wireless ASP—SMS Broadcast, M-Commerce, Unified Messaging, 2000, 4 pages.
RFC 1983, Network Working Group Request for Comments; G. Malkin, Xylogics, Aug. 1996, 2 pages.
RFC 1738, Network Working Group Request for Comments; T. Berners-Lee, L. Masinter, Xerox Corporation, Dec. 1994, 21 pages.
ENUM Requirements, Telephone Number Mapping Internet Draft, draft-ietf-enum-rqmts-01.txt, A. Brown, Jun. 2000, 6 pages.
Frequently Asked Questions About ENUM, ENUM Working Group, InternetDraft, Draft-Shockey-enum-faq-01.txt, Richard Shockey, Jul. 26, 2000, 11 pages.
Links, www.enumworld.com/resources/index.html, Verisign, Inc. and Telcordia Technologies, Inc., 2001.
M. Pluke, Specialist Task Force 180, Standards for Universal Communications Identification Solutions, http://portal.etsi.org/hf/STFs/STF180.asp, Mar. 1, 2001.
DEG/HF-00025, Human Factors (HF); Standardization for Universal Communications Identification Solutions, V0.O.3 ETSI, Oct. 2001.
Rosenberg, Jonathan D., The Session Initiation Protocol (SIP): A Key Component for Internet Telephoney Computer Telephony, vol. 8, Issue 6, Jun. 2000, pp. 124-139.
http://www.radvision.com/papers/C1_What_is_SIP.html, What is SIP?, Apr. 28, 2002, 3 pages.
Bush, Randy, http://search.ietf.org/internet-drafts/draft-vmbk-enum-trip-00.txt, Jul. 13, 2001, 4 pages.
Schulzrinne, Henning, Personal Mobility for Multimedia Services in the Internet, IDMS '96 (European Workshop on Interactive Distributed Multimedia Systems and Services), Berlin Germany, Mar. 4-6, 1996, 18 pages.
Messagepoint Unified Messaging, 1999, 3 pages.
Ariana Eunjung Cha, The Washington Post, Apr. 22, 2001, Showdown at the Digital Corral, pp. H1 and H4.
Martin, Scott, Frequently Asked Questions, www.theultimates.com. The Ultimates, 1996-2000, 2 pages.
Brown, A., ENUM Requirements, Telephone Number Mapping Internet Draft, draft-ietf-enum-rqmts-01.txt, Jun. 2000, 5 pages.
Shockey, Richard, Frequently Asked Questions about ENUM, Enum Working Group, Internet Draft, Draft-Shockey-enum-faq-01.txt, Jul. 26, 2000, 11 pages.
Links, www.enunnworld.com/resources/index.html, Verisign, Inc. And Telcordia Technologies, Inc. 2001, 4 pages.
Pluke, M., Specialist Task Force 180: Standards for Universal Communications Identification Solutions, http://portal.etsi.org/hf/STFs/STF180.asp. Mar. 1, 2001, 2 pages.
DEG/HF-00025, Human Factors (HF); Standardization for Universal Communications Identification Solutions, V0.0.3 ETSI, Oct. 2001, 6 pages.
SIP: Session Initiation Protocol, Internet Engineering Task Force, Internet Draft, draft-ietf-sip-rfc2543bis-04.ps, Jul. 20, 2001, 142 pages.

Rosenberg, Jonathan D., The Session Initiation Protocol (SIP): A Key Component for Internet Telephony, Computer Telephony, vol. 8, Issue 6, Jun. 2000, pp. 124-139. 14 pages.

http://www.radvision.com/papers/C1_What_is_SIP.html What is Sip?, Apr. 28, 2002, 3 pages.

Bush, Randy, http://search.ietf.org/internet-drafts.draft-ymbk-enum-trip-00.txt Jul. 13, 2001, 4 pages.

Sinnreich, Henry, WCOM, Internet Communications Enabled by SIP, http://www.sipforum.org/whitepapers/sinnreich.htm, Aug. 2000, 12 pages.

Messagepoint Unified Messaging, 1999. 3 Pages.

Messagejet, Free Worldwide Unified Messaging, 1999, 3 pages.

Virtualplus—Messaging and Wireless ASP—SMS Broadcast, M-Commerce, Unified Messaging, 2000. 4 Pages.

Airana Eunjung Cha, The Washington Post, Apr. 22, 2001, Showdown at the Digital Corral, pp. H1 and H4. 2 pages.

Cisco Unified Communications White Paper—Unified Communications: Information Exchange Independent of Time, Location, or Device, Jul. 2, 2000, 6 pages.

Cisco ICS—Unified Messaging, Products and Platforms, 1992-2000, 2 pages.

Martin, Scott, The Ultimate White Pages, 1996-2000, 3 pages.

Martin, Scott, The Ultimate Email Directory, 1996-2000, 2 pages.

VeriSign Global Registry Services, Telcordia Technologies, ENUM World Informational Paper, Nov. 30, 2000, 5 pages.

Malkin, G., RFC 1983, Network Working Group Request for Comments; Xylogics, Aug. 1996, 2 pages.

Berners-Lee, T., Masinter, L, RFC 1738, Network Working Group Request for Comments; Xerox Corporation, Dec. 1994, 21 pages.

Schulzrinne, Henning, Personal Mobility for Multimedia Services in the Internet, IDMS '96 (European Workshop on Interactive Distributed Multimedia Systems and Services), Berlin, Germany, Mar. 4-6, 1996, 18 pages.

* cited by examiner

300

| Domain Name | IP Address |
|---|---|
| Domainname.com | 123.45.67.89 |

| Preference | Type | Description | Data |
|---|---|---|---|
|  |  | Universal POC ID | John.Smith@domainame.com |
|  | Voice | Home Telephone No. 1 | (202) 555-1234 |
|  | Voice | Home Telephone No. 2 | (202) 555-1233 |
| * | Voice | Business Telephone No. 1 | (202) 555-1235 |
|  | Voice | Business Telephone No. 2 | (202) 555-1238 |
| * | Fax | Facsimile No. | (202) 555-1236 |
| * | Email | Email Address | John.Smith@domainame.com |
| * | Postal | Business Address | 5555 Wisconson Ave., N.W. Washington, DC 20007 |

FIG. 4

| User ID | John.Smith |
|---|---|
| Type of Contact | Voice |

UNIVERSAL POINT OF CONTACT IDENTIFIER SYSTEM AND METHOD

CROSS REFERENCE TO RELATED APPLICATION

This application is a divisional of application Ser. No. 09/873,433 filed Jun. 5, 2001, which claims benefit of Provisional Application No. 60/274,208 filed Mar. 9, 2001. The entire disclosures of the prior applications is hereby incorporated by reference.

BACKGROUND OF THE INVENTION

1. Field of the Invention

The invention relates to communication systems. More particularly, it relates to methods and apparatuses for establishing communication sessions between a communication initiator and a recipient of the communication based on preferences of the recipient.

2. Description of the Related Art

Communication has become a vital part of every day life. For some people, being disconnected is a concept that is inexcusable. If not using office telephones, people use cellular telephones. If not accessing email via a home or office computer, people buy various devices that allow them to access email accounts outside the home or office.

With all these different modes of communication comes a long list of communication points of contact. These points of contact range from telephone numbers, including numbers for cell phones, faxes, home phones, office phones, and pagers, to postal addresses, to email addresses. With different competing companies offering different services, these points of contact (POC) can often be subject to change. For some people, these changes happen more frequently than for others.

Out of a need to consolidate a person's points of contact a new breed of company has developed. These companies aim to consolidate an individual's communication needs into one portal. Such companies, referred to here as a communication portal service company, give a subscriber to that service one telephone number. This one telephone number is intended to replace all other telephone numbers. The subscriber could then give out only one telephone number to his or her clients and friends, as opposed to the slew of numbers he or she would normally give out.

However, people using such communication portal services still have to supply additional contact information. For example, a subscriber to one of these communication portal services would still have to provide others with the subscriber's various email addresses and physical addresses associated with the subscriber. These communication portal services, while consolidating some information, in the end give the subscriber yet another number for people to remember. The result is that instead of making the list of POC's shorter, these communication portal services add yet another item to the list of contact information associated with the subscriber. Accordingly, there is a need to consolidate all or many of a person's POC's into one ID.

As with any POC, it needs to be unique to the individual and recognized as such from a global perspective. People's names, as is commonly known, are not useable as ID's because, in general, they are not unique. As an example, the name John Smith is a very common name and does not uniquely identify only one person. Telephone numbers on the other hand, are unique and have been used for decades to place telephone calls. However, telephone numbers do not reflect their owner's name and often can be difficult to remember. Moreover, telephones are designed with keys for entry of numeric telephone numbers, and do not easily facilitate entering non-numeric information.

Email addresses are both unique and often reflect an individual's name. For example, an individual named John Smith might have the email addresses jsmith@domainame.com, john@domainame.com, john.smith@domainame.com, js@domainame.com, john.smith@domainame.org, etc. In these examples, "domainame" indicates the network domain in which the subscriber, John Smith, has an email account. The individual also can have email accounts with other service providers using different network domains. Accordingly, in the example here, John Smith could have additional email addresses for different network domains, such as John.Smith@domainame1.com, John.Smith@domainame2.com, etc. Each of these email addresses would be recognized as relating to John Smith's name, and are more likely to be remembered than his telephone number.

Some communication portal services offer unified messaging or unified communications services. Such services allow a caller to leave a message for a recipient using a variety of means, such as facsimile machines, telephones, and computers, and then store those messages in a message box for the recipient to retrieve. These communication portal services might also notify a recipient of new messages in a variety of ways, such as by voicemail, email, etc. However, these services do not provide a communication session between a caller and a recipient, but only allow for messaging between them.

Other services and systems enable a caller to connect with a variety of devices designated by the recipient, but require the caller to use a computer to access a web page containing the recipient's contact information. The web page returns the recipient's contact information to a program, such as a Java applet, on the caller's computer so the caller can use the program to contact the recipient using the returned contact information. However, by returning the recipient's contact information to the caller's computer, the recipient's contact information is in jeopardy of being disclosed to the caller. Further, such systems do not automatically establish a communication session with the recipient's preferred point of contact, but require additional action by the caller or the caller's computer to initiate the contact. Further still, the caller must use a computer with a highly functional web browser to initiate the contact. No communication portal services allow a recipient to distribute easily remembered point of contact information, such as the recipient's email address, that a caller can use to automatically establish a communication session with the recipient's preferred point of contact. Accordingly, there is a need for such a service and a system to enable that service.

SUMMARY OF THE INVENTION

A universal point of contact identifier (a POC ID) enables a communication initiator, such as a caller who places a telephone call, to contact a subscriber of a point of contact service, at the subscriber's preferred destination device. A communication initiator using an initiator's device enters the POC ID, which preferably is an email address, that is routed to a requester unit. Preferably, the communication initiator enters the email address by using a telephone with an alpha-numeric entry device, such as a keyboard. Alternatively, the communication initiator can enter the email address by voice, and a voice recognition unit transforms the POC ID into a computer readable string corresponding to the email address. The requestor unit, based on the input POC ID, sends a request for the subscriber's preferred point of contact information to a server in the network domain providing the subscriber's email service. The server identifies a lookup table holding the subscriber's preferred contact information. Based on the type of contact the initiator indicates, the preferred point of contact information for the specified type of contact is returned to the requester unit. The requester unit then controls a switch to connect the initiating device with the destination device corresponding to the returned preferred contact information.

BRIEF DESCRIPTION OF THE DRAWINGS

FIG. 3 shows a data structure, preferably residing in the requester unit shown in FIG. 2, associating a subscriber's universal point of contact ID domain name with an Internet Protocol (IP) address for a server on which the subscriber's contact information is stored.

FIG. 4 shows a data structure, preferably residing in the server and lookup table shown in FIG. 2, with a subscriber's universal point of contact information recorded in it.

FIG. 5 shows a message structure for a message sent from a requester unit to a server in which a subscriber's universal point of contact information is recorded.

DETAILED DESCRIPTION OF THE PREFERRED EMBODIMENTS

Figure 1A:
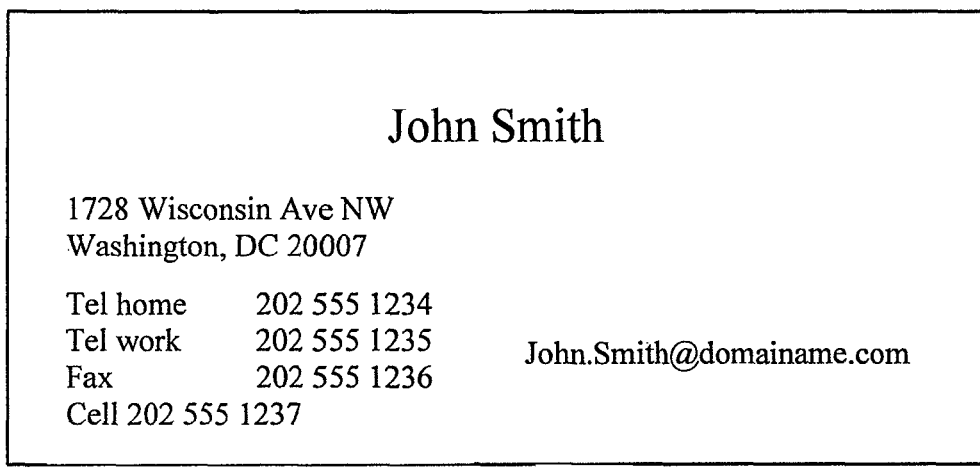
FIG. 1A is an illustration of a conventional business card with many different points of contact printed on the card.

Preferred embodiments according to the present invention are described below with reference to the above drawings, in which like reference numerals designate like components.

Figure 1B:
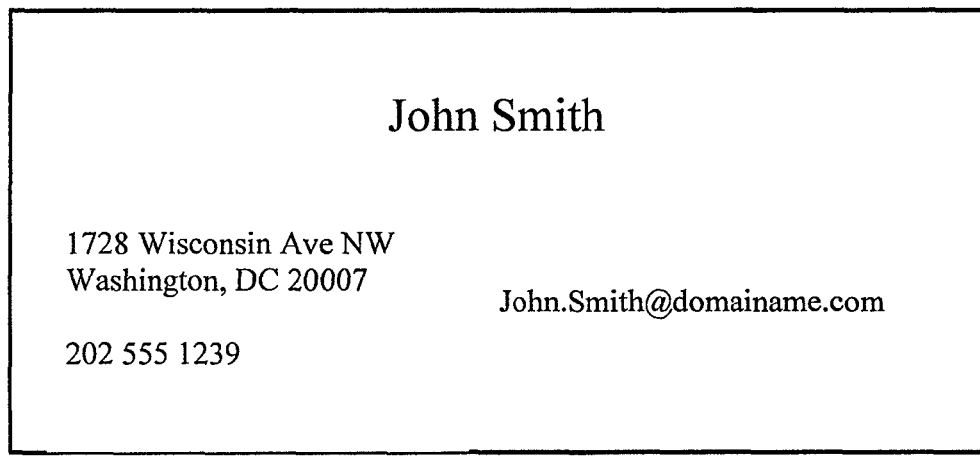
FIG. 1B is an illustration of another conventional business card, with fewer points of contact printed on the card than the card shown in FIG. 1A, but still having multiple points of contact printed on the card.

A universal point of contact (POC) identifier (ID), according to the present invention, is a unique identifier that is associated with a person and that person's points of contact. Such a person with a POC ID can subscribe to a service that stores information about the person's various points of contact, for example, the person's home telephone numbers, business telephone numbers, facsimile numbers, email addresses, and physical addresses (e.g., home and business postal addresses). An effect of having a universal POC ID is that only that POC ID need be given to others in order to contact that person to whom the POC ID is assigned (hereinafter "the subscriber"). This effect is illustrated by considering a person's business card. A conventional business card is shown in FIG. 1A, and includes a physical address, two telephone numbers, a facsimile number, a cellular telephone number and an email address, for a total of six points of contacts. FIG. 1B shows a business card that could be used by subscribers of certain existing services that consolidate the subscriber's telephone numbers into a single telephone number. However, a subscriber to such a system still must inform others of the subscriber's physical address and email address, in addition to the consolidated telephone number. Accordingly, there is a need to further simplify the point of contact information a person disseminates.

Figure 1C:
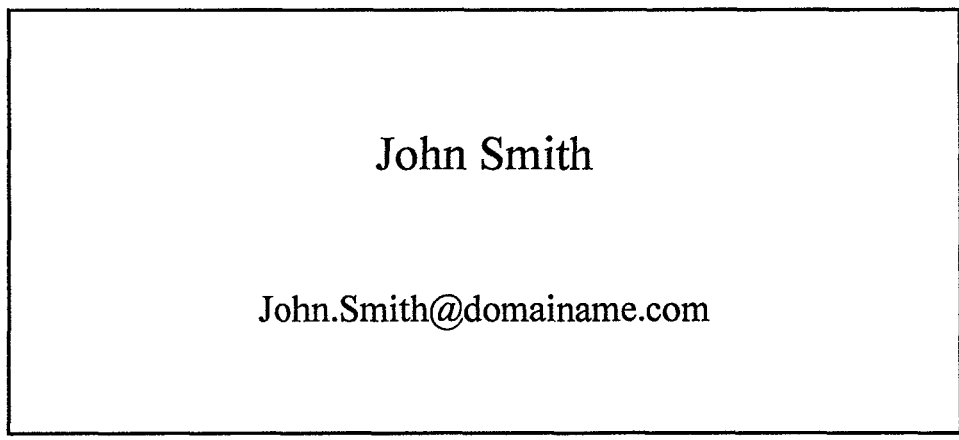
FIG. 1C is an illustration of a business card that has only a single point of contact printed on it, and can be used concomitantly with the present invention.

The present invention meets that need by enabling subscribers to disseminate only a single, universal point of contact ID, preferably an email address. This situation is illustrated by FIG. 1C in which the only information that need be printed on a subscriber's business card is the subscriber's name and the subscriber's universal POC ID, here, an email address. As shown in FIG. 1C, the subscriber to the universal point of contact service has a user ID of "John.Smith" in the network domain "domainname.com". Often, the domain name will be the name of the subscriber's service provider.

Universal Point of Contact System

Figure 2:
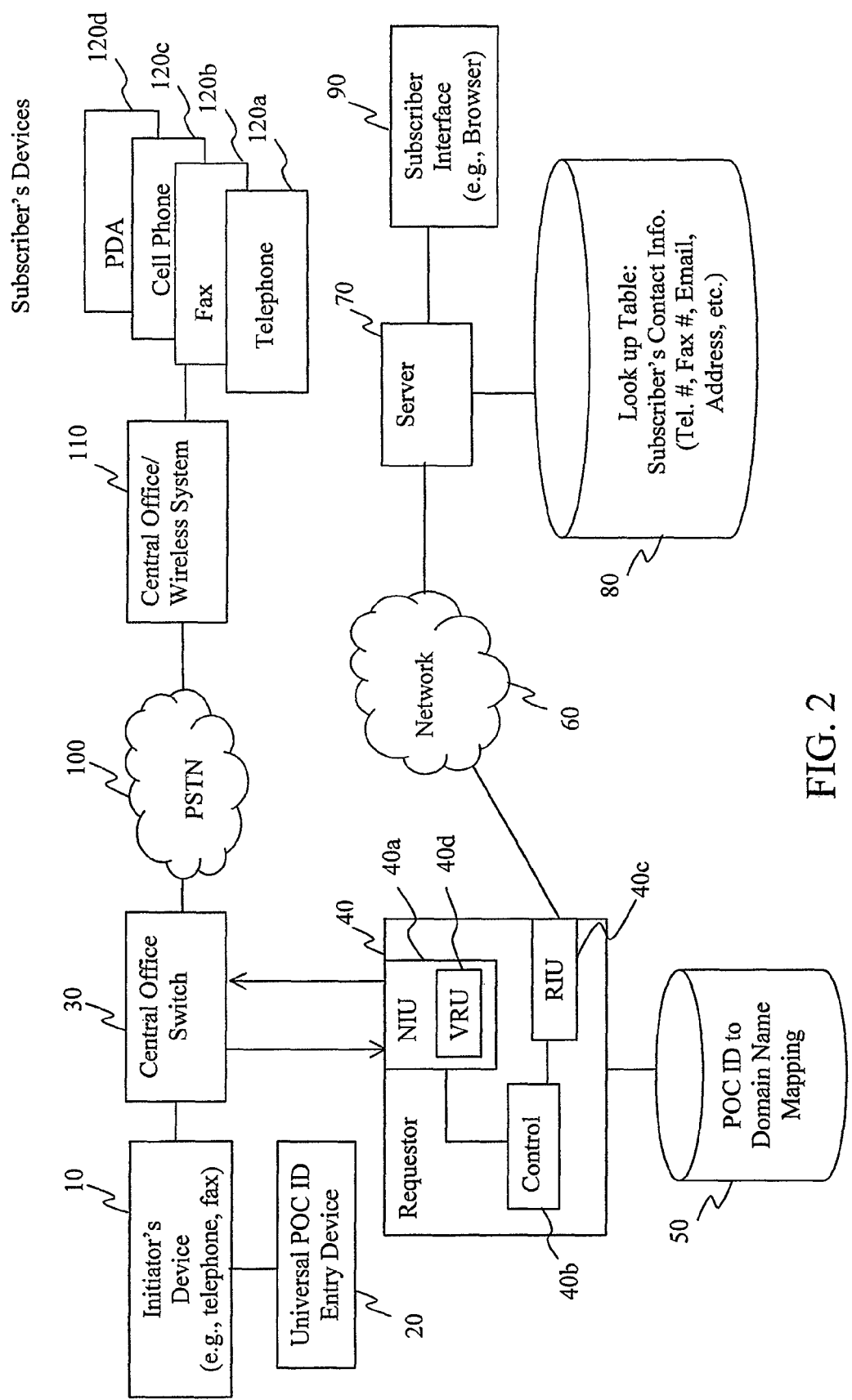
FIG. 2 is a block diagram illustrating a universal point of contact (POC) identifier (ID) system, in which a subscriber to a universal contact service has a universal point of contact ID that is used by a communication initiator to initiate contact with the subscriber.

A system for using a universal POC ID is shown in FIG. 2. The system includes an initiator's device 10 that enables a communication initiator to enter a subscriber's universal POC ID while using, preferably, a conventional device such as a telephone or facsimile (fax) machine. An example of a communication initiator is a caller using a telephone device to call the subscriber. The communication initiator is referred to hereinafter as a caller, however, it will be understood that a communication initiator can initiate communication with a subscriber using initiating devices other than a telephone. The caller uses the initiator's device to input a universal POC ID, preferably an email address, in order to establish a communications session with a device the subscriber has designated as his or her preferred point of contact, referred to here as a destination device. The initiator's device 10 also enables a caller to indicate the type of contact the caller is attempting to make with the subscriber, such as a voice conversation or a fax transmission. Preferably, the initiator's device 10, shown in FIG. 2, has either connected to it or integral with it, a universal POC ID entry device 20, such as a keyboard with separate numeric and non-numeric keys, for entering numeric and non-numeric information, respectively. The communication session can be established through a public switched telephone network (PSTN), using a conventional telephone or fax machine as the initiator's device. Alternatively, the communication session can be established in an alternative communication medium, for example as a voice session over a data network, using for example, a voice over internet protocol (VoIP).

Preferably, the initiator's device 10 is connected to a switch 30 in a telephone company's central office. Connected to the switch 30, preferably, is a requester unit 40. The requestor unit 40 is connected to a data network 60.

The requester unit 40 includes a network interface unit (NIU) 40a for interfacing with the telephone network switch 30, a control unit 40b connected to the NIU for controlling the requestor unit, and a repository interface unit (RIU) 40c, which is connected to the control unit 40b, and interfaces with the data network 60. The NIU 40a can include a voice response unit (VRU) 40d for receiving voice signals from the switch 30 and converting them to textual information.

The requestor unit's role is to receive, via switch 30, a universal POC ID input to the initiator's device 10 by a caller, and locate a repository of the subscriber's contact information based on the universal POC ID. Once that repository is located, the POC ID can query it and receive back information concerning the subscriber's preferred contact point. Preferably, the requester unit 40 uses well-known domain name services (DNS) to locate the repository based on the POC ID. Alternatively, the requester unit can have a storage unit 50 that holds routing information for locating the subscriber's preferred contact information. FIG. 3 shows an example of routing information 300 held in storage unit 50. The routing information associates a domain name in a universal POC ID with a network address. Here, the domain name in a universal POC ID, John.Smith@domainame.com, is associated with an internet protocol (IP) address for the network domain servicing John Smith's email address. The routing information 300 can be used when domain name services (DNS) are not available.

The requester unit 40 is connected to the data network 60, such as an internet, to communicate with servers connected to the network 60. Here, the subscriber's service provider has a server 70 located in a network domain where the subscriber has his or her email account.

Associated with server 70 is a storage unit 80 holding the subscriber's points of contact information, such as telephone numbers, facsimile numbers, email addresses, postal addresses, etc. The storage unit 80 can contain a lookup table, such as the example lookup table 400 shown in FIG. 4. Together the server 70 and storage unit 80 form a repository for holding the subscriber's preferred point of contact information. A subscriber can access the server 70 and lookup table 400 in storage unit 80 by way of a subscriber interface 90, such as with a World-Wide Web browser 90, and can add or modify the POC information held in the database 80. The subscriber, via the interface 90, can also designate the POC IDs by which the subscriber prefers to be contacted.

The switch 30 also connects initiator's device 10 to a PSTN 100, and operates to route a call to a destination device. Also connected to the PSTN 100, at a destination end, is another central office 110. Central office 110 connects a destination device, such as a telephone 120a or a fax machine 120b, to the PSTN 100. Alternatively, if the destination device is a wireless device, such as a cellular telephone 120c or a personal digital assistant (PDA) 120d, a wireless system 110 receives the call from the PSTN and transmits it to the subscriber's wireless destination device. The wireless system 110 includes a master switch center (MSC). The MSC, in response to receiving a call for the subscriber's device, establishes a wireless connection with that device, thereby establishing a connection between the initiator's device 10 and the subscriber's wireless device (e.g., cellular telephone 120c) corresponding to the subscriber's preferred point of contact.

The requester unit 40, preferably, upon receiving the universal POC ID and an indication of the type of contact, will inspect the POC ID and detect the domain name of the web server 70. For example, if the caller enters the POC ID "John.Smith@domainame.com," the requestor unit 40 will recognize the domain name as "domainame.com." It will then formulate a request for the subscriber's preferred point of contact and send that request to the server identified by the domain name in the POC ID. The requester unit 40 can send the request using conventional domain name services (DNS). Alternatively, the requester unit 40 can include a database 50 that holds mapping information relating a POC ID to a domain name for the subscriber. FIG. 3 shows an example data structure 300 that maps the domain name portion of a universal POC ID (i.e., John.Smith@domainame.com) to a domain address (i.e., Internet protocol (IP) address: 123.45.67.89) for a server in a domain servicing the subscriber.

The requestor unit 40 communicates with the server 70 by sending a message 500, an example of which is shown in FIG. 5. The message 500 includes the subscriber's user ID known within the server's domain, and an indication of the type of contact the initiator is attempting. Alternatively, message 500 can contain a fully qualified POC ID. In the case illustrated by FIG. 5, the caller is attempting to initiate a voice contact with the subscriber, and accordingly, the "type of contact" field in message 500 indicates that the initiator is attempting to contact the subscriber by telephone to have a voice conversation with the subscriber.

The storage unit 80 holds the subscriber's point of contact information in a manner suitable for the server environment. For example, a lookup table can be employed to hold the subscriber's point of contact information. Where appropriate, the point of contact information can be stored in a database. In either case, the universal POC ID in message 500 operates as a key or an index to locate and reference the subscriber's point of contact information. FIG. 4 shows a data structure 400 for holding the subscriber's point of contact information. Here, for example, the subscriber's POC data structure associates the subscriber's universal POC ID with two different home telephone numbers, two different business telephone numbers, a facsimile telephone number, an e-mail address, and a postal address, all for contacting the subscriber. The POC data structure also includes a "type" field associated with each POC entry to indicate the type of POC for that entry. The POC data structure also includes a "preference" field associated with each POC entry to indicate if the subscriber has designated that entry as a preferred point of contact. The data structure 500 can take any form so long as a subscriber's point of contact information can be located and retrieved based on the subscriber's universal POC ID, or a portion of it.

Operation and Use of a Universal Contact Identifier

Figure 6A:
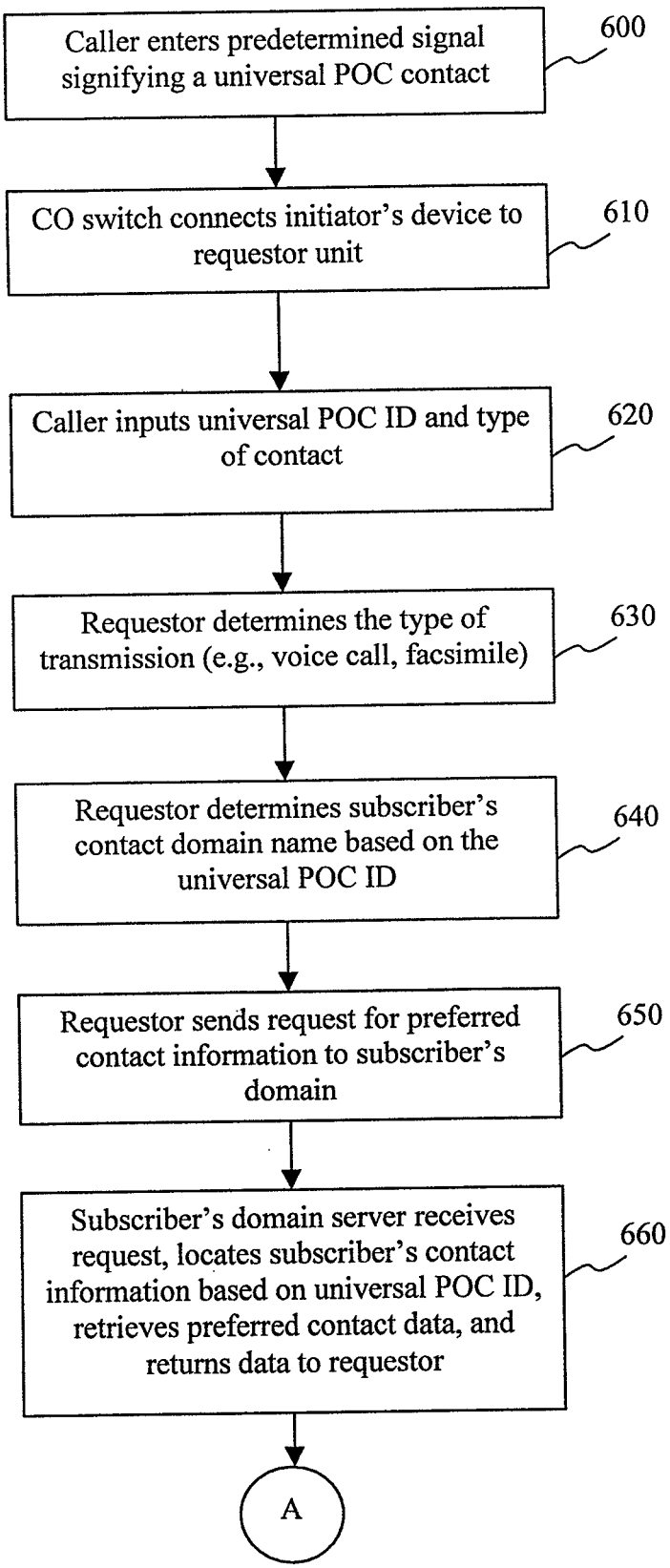
FIGS. 6A-C are flowcharts showing a process for using a universal point of contact ID to contact a subscriber.
Figure 6B:
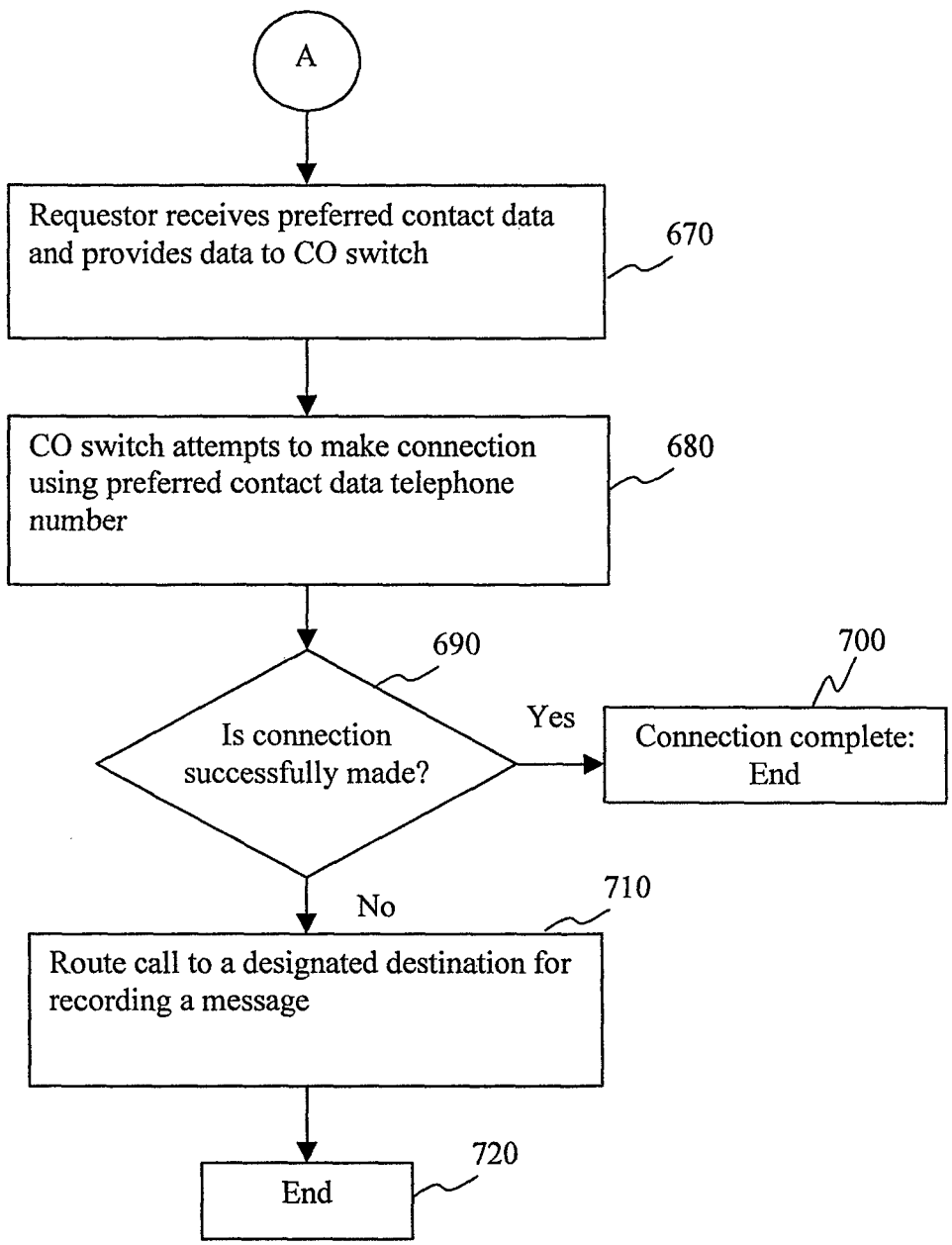
Figure 6C:
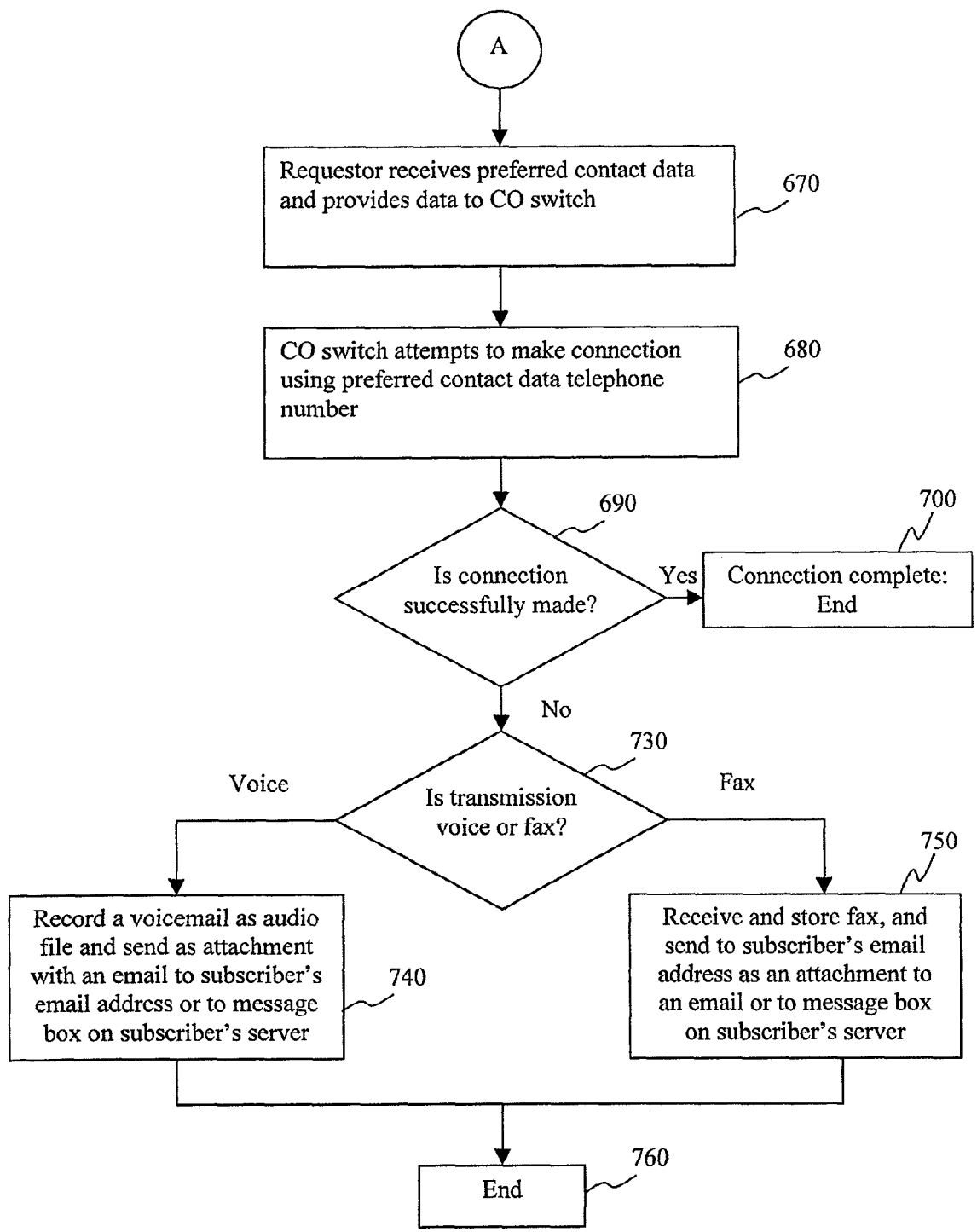

FIGS. 6A and 6B are flowcharts illustrating a process that a caller can follow to send a message to a subscriber by way of the subscriber's preferred contact method. Referring to FIG. 6, a caller initiates a contact with a subscriber by first entering a predetermined input signifying that a universal POC ID will be used to make the contact (600). For example, assuming the initiator's device is a telephone, the caller can initiate a contact using a universal POC ID by entering a predetermined dialing sequence, such as *88. This predetermined sequence signifies to the CO switch 30 that the contact will be made using a universal POC ID, and the CO switch connects the initiator's device 10 with the requestor unit 40 (610).

After entering the predetermined sequence, the caller enters the universal POC ID and an indication of the type of contact the caller desires to make with the subscriber (620). Preferably, the universal POC ID is an email address. A caller can enter the email address any number of ways. For example, if the initiator's device 10 is equipped with a keyboard, the caller can type the subscriber's email address, and the email address is passed to the requestor unit 40. Alternatively, the voice response unit (VRU) 40d can be employed to allow the caller to input the email address by speaking it (620). The VRU can be located within the NIU 40a of the requester unit 40, as shown in FIG. 2, but can also be located elsewhere such as an enhanced service provided by the telephone service provider. The VRU can be programmed to prompt the caller to speak the email address and indicate verbally the type of contact. The VRU can include voice recognition capabilities to convert the spoken email address into an address in a computer readable form, such as an ASCII string, using known voice recognition technology.

Operations 600 through 620 described above illustrate an example of a process for entering an email address. However, the invention is not limited to those operations, and other techniques can be used. For example, if the CO switch 30 is equipped to support voice recognition dialing, that technique can be used to enter the subscriber's email address. In that case, a caller, when first connecting to the CO switch, instead of entering a predetermined dial tone sequence, could just speak the email address. If the CO switch 30 is equipped to recognize a voice, as opposed to recognizing only dial tones, it could accept the spoken email address and translate it into a computer readable string to pass to the requestor unit 40. Similarly, either the CO switch 30 or the requestor unit 40 can prompt the caller to indicate the type of contact desired. The caller would then indicate, verbally for example, the type of desired contact.

The requestor unit 40 receives the POC ID and the indicator of the type of contact, and based on the type of contact will determine the appropriate subscriber contact information to request from the lookup table 80, i.e., a facsimile number, telephone number, etc. (630). The requester unit then extracts the domain name from the universal POC ID (640). Alternatively, the requester unit 40 looks up the network address for a server storing the subscriber's POC information, by locating the record 300 in database 50, if the requestor unit includes such a database 50. Once the subscriber's domain server's address is determined, the requester unit sends a message, such as message 500 shown in FIG. 5, to server 70 by way of a network 60 (650).

The subscriber's domain server 70 receives the message from the requester unit 40, and in response to that message, locates the subscriber's POC record 400 in storage unit 80, for example, in lookup table 400. The server 70 retrieves the requested POC information from the subscriber's POC record 400. The POC information that is retrieved is POC information that is appropriate for the type of contact (e.g., a facsimile number in this example) and that has been designated by the subscriber as the preferred POC for that type of communication. The server then returns that retrieved POC information to the requester unit 40 (660). For example, if the caller indicates a desire to contact the subscriber to have a voice conversation, the server 70 locates the subscriber's record, here the record 400 for universal POC ID John.Smith@domainame.com. The server performs a lookup in record 400 for the voice type entry that the subscriber has designated as the preferred voice number. In this case, the subscriber has designated his or her first business telephone line as the telephone number at which the subscriber prefers to be called. Accordingly, the server 70 retrieves that telephone number, (202) 555-1235, and returns it to the requester unit 40.

At this point in the flowchart shown in FIG. 6A, the connector labeled "A" designates a similarly labeled connector point in FIG. 6B, at which the process flow continues.

The requestor unit 40 receives the preferred contact data from server 70, and sends that data in the appropriate form to CO switch 30 (670). In the example here, the requester unit 40 receives the subscriber's first business telephone line number, (202) 555-1235, and sends it to CO switch 30. The CO switch 30 uses the preferred contact information sent to it to establish a connection to the specified point of contact (680). Here, the CO switch 30 uses that telephone number to connect the initiator's device to the destination device attached to the subscriber's first business telephone line. The requester unit can continue to monitor the call after sending the preferred contact data to the CO switch to intervene if necessary. A subscriber may want to keep the subscriber's preferred contact data hidden from those attempting to contact the subscriber, thereby concealing the destination device and possibly the subscriber's location. Since the requestor unit interacts with the CO switch to automatically establish the connection with the preferred point of contact, there is no need to send the preferred point of contact data to the initiating device. Accordingly, this aspect of the invention enables an initiating device to connect with the subscriber's preferred point of contact without disclosing that point of contact to the initiator. Alternatively, the requester unit can be programmed to send the preferred point of contact data to the initiating device.

If the connection is successfully established (690), the process is complete and the voice or fax session between the initiator's device and the subscriber's preferred device commences (700). However, if the CO switch 30 cannot establish a communication session with the preferred POC (690), then the requestor unit will handle disposing of the call, such as by directing the call to a voice messaging unit to have a message recorded and delivered to the subscriber (710). Preferably, the destination device at the subscriber's preferred contact point has the capability to record a voice message if the subscriber does not answer the call. Alternatively, however, the voice messaging unit could be located at a telephone number designated in the subscriber's lookup table as the desired number for recording voice messages (not shown in FIG. 4). Accordingly, the requestor unit 40 would control the CO switch to direct the call to that voice message number. After the caller's initiating device is connected to a voice messaging unit, the process ends (720).

In another alternative, the requestor unit 40 has the capability to record messages and deliver them to the subscriber, in the event the connection with the subscriber's preferred point of contact is not made. In this alternative, operations 710 and 720 are replaced with operations 730 through 760, shown in FIG. 6C, where like reference numerals refer to like operations in FIG. 6B. In this alternative, if a connection is not made with the subscriber's preferred contact point, the process flows to operation 730. Here, the requester unit 40 handles the call differently, depending on whether the type of contact is a voice contact or a fax contact (730). If the attempted connection was for a voice session, the requester unit 40 provides for the caller to record a voice message and then sends that recorded message as an email to the subscriber or to a message box on the subscriber's server (740). If the attempted connection was for a fax session, the requester unit 40 receives the fax, stores it and sends it as an image file to the subscriber's email address or to a message box on the subscriber's server (750). Once the voice recording or the fax recording is sent to the subscriber's email address or message box, the process ends (760).

Physical Point of Contact Addresses

Another application of the invention is to provide physical addresses that the subscriber desires to make available, such as the postal addresses for the subscriber's home and business. Such physical addresses can be recorded in the subscriber's point of contact information. For example, the lookup table 400 shown in FIG. 4 has recorded in it the subscriber's business address.

This aspect of the invention can be used to provide a shipper with timely information about a subscriber's preferred address. Here, the subscriber grants certain shippers, such as overnight delivery companies, access to the subscriber's preferred postal address and voice address. In this case the subscriber supplies the shipper with his or her universal POC ID. The shipper then accesses the subscriber's preferred shipping address by sending a request for the subscriber's preferred postal address, and if necessary the subscriber's preferred voice point of contact. The shipper can have a requester unit 70 with an interface to it, such as a web browser interface, to enter the subscriber's universal POC address, such as the subscriber's email address, to request a physical address for delivery. The server 70, upon receiving the request, retrieves the physical address in the lookup table 400 that is designated as the preferred physical address for deliveries, and returns it, and optionally the preferred voice address, to the requestor unit for the shipper's use. The shipper then sends the package to that preferred physical address.

The invention benefits both the shipper and the consumer, because the shipper has the most current, and hence, likely the most accurate address for the consumer. The consumer gets the package delivered to the address he or she prefers. This aspect of the invention is especially beneficial if the consumer had recently moved to a new address or if the consumer frequently travels.

Alternatives

Figure 7:
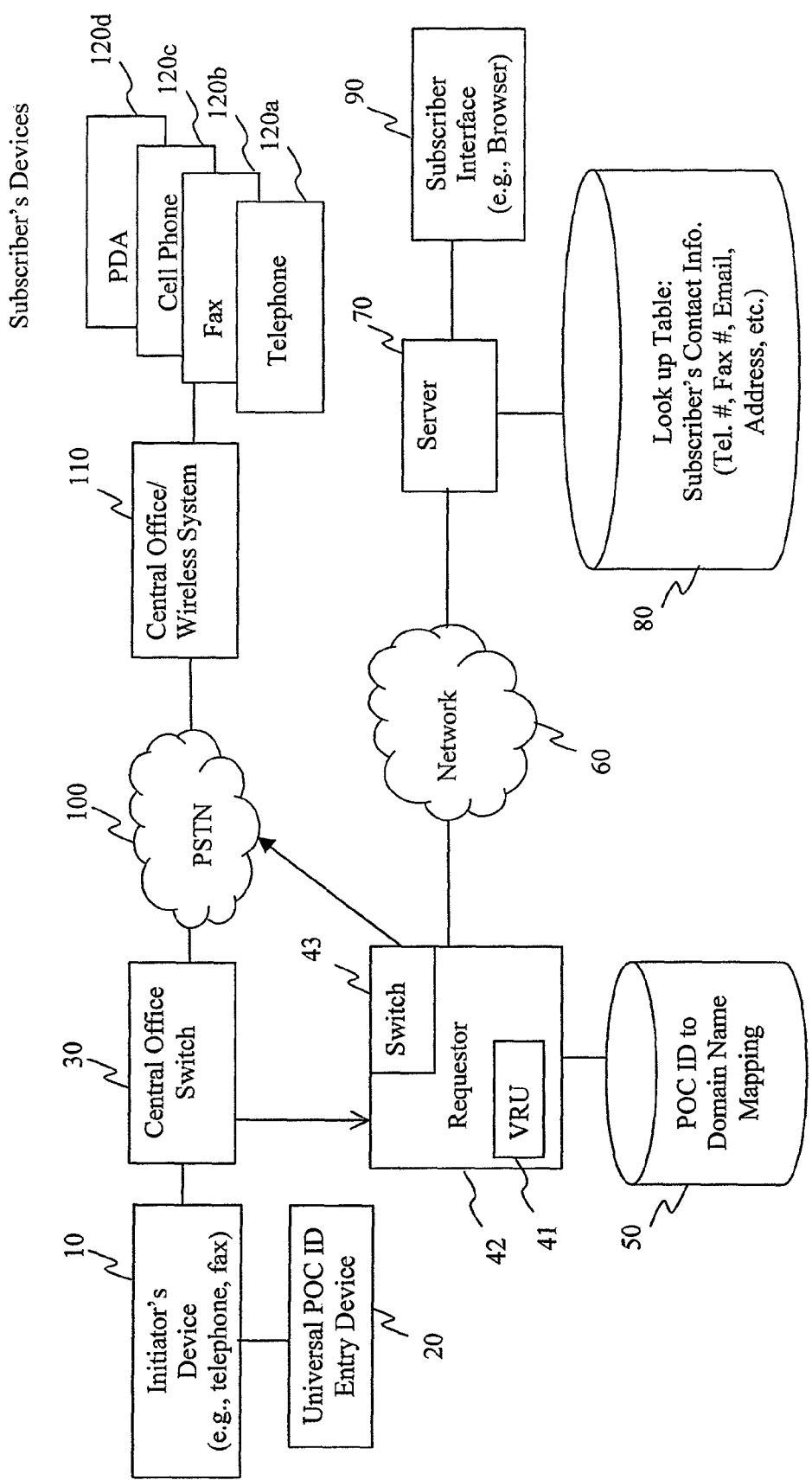
FIG. 7 is a block diagram illustrating another embodiment of a universal point of contact (POC) identifier (ID) system, in which the requester unit includes a switch.

Another aspect of the invention is described with reference to FIG. 7, in which a requester unit 42 includes a switch 43 for connecting to a PSTN. In this alternative the switch 43 within requester unit 42 makes the connection between the initiator's device and the subscriber's preferred destination device by sending the telephone number for the subscriber's preferred point of contact to central office switch 30. This avoids the need for the CO switch 30 to match the subscriber's preferred telephone number provided by the requestor unit to the call from the initiator's device.

According to still another aspect of the invention, instead of the switch 43 connecting to a PSTN 100, the switch 43 can connect to an alternative network, such as a data network. This data network can provide for a voice connection, using a protocol such as voice over internet (VoIP).

Although the requester unit 40 is shown in FIG. 2 separate from the CO switch 30, the requestor unit 40 can be integrated into the CO switch 20. In this regard, the CO switch receives the email address input by way of a keyboard-enabled telephone or by way of the caller speaking it. If the email address is spoken, the voice response unit translates the spoken email address into computer readable form. The CO switch then sends a request to the server 70 for the subscriber's preferred point of contact information. The central office switch 30, described here, can be a well-known service control point (SCP), appropriately programmed to operate as described here.

The invention also enables a subscriber to maintain his or her point of contact information confidential. The requester unit 40 and server 70/lookup table 80 can be modified to provide point of contact information only for callers the subscriber has designated to the server 70/lookup table 80. The requester unit 40 can use caller ID features provided by the central office switch 20 to identify the caller, or can be programmed to require the caller to enter identifying information such as a user ID and password that the subscriber administers.

According to another aspect of the invention, the requester unit's involvement in a call can terminate once a subscriber's preferred POC telephone number is sent to a switch to initiate the call. As discussed above, the requestor unit can continue to monitor the call until it is successfully placed, or alternatively, can continue to monitor the call for a longer period of time up through the end of the call to afford the call participants with further calling options.

According to yet another aspect of the invention, a subscriber can achieve a find-me-follow me function by designating more than one point of contact as the preferred point of contact. Here, server 70 returns point of contact data for more than one preferred point of contact, based on the subscriber's designations. The requestor unit 40 uses the plurality of preferred points of contact to initiate contacts with the subscriber. The requester unit 40 can initiate these contacts in parallel with one another, or in a serial manner. For example, if three telephone numbers are returned as the preferred contact points, the requester unit 40 can initiate three telephone calls at the same time. By monitoring which telephone call successfully connects with the subscriber, the requester unit 40 can terminate the other calls. Alternatively, the requester unit 40 can initiate calls to the three telephone numbers in sequence. If the subscriber is not contacted using the first telephone number, the second telephone number is attempted, and then the third number if the second number is not successful. The calls can be initiated using a combination of parallel and sequential calls. For example, the requester unit 40 can attempt to place the call using a first of the preferred points of contact. If that attempt fails, the requester unit 40 can then initiate calls to the other preferred points of contact, in parallel, all at substantially the same time.

According to still another aspect of the invention, the server 70 is programmed to return point of contact data for more than one preferred point of contact, according to preferences the subscriber designates. Here, the subscriber designates one of the points of contact as a primary contact point for a particular type of communication, such as for receiving facsimiles. The subscriber also designates one or more other points of contact as secondary points of contact, for use if a connection cannot be established using the primary point of contact. The requester unit 40, upon receiving the primary and secondary preferred points of contact, would attempt to establish a communication session using the primary preferred point of contact, and if that attempt is unsuccessful, it uses the secondary preferred points of contact to establish a communication session. The attempts using the secondary preferred points of contact may be performed in parallel or sequentially.

According to yet another aspect of the invention, the subscriber can designate certain preferred points of contact based on the day of the week, and/or the time of day. For example, the subscriber can designate that on Monday through Friday from 9 a.m. to 5 p.m. a work telephone number is the preferred point of contact. From the hours of 5 p.m. to 10 p.m., for example, the subscriber can designate his or her home telephone number as the preferred point of contact. Further still, the subscriber can designate that from the hours of 10 p.m. to 9 a.m. the subscriber's voicemail telephone number is the preferred point of contact.

According to yet a further aspect of the invention, if a plurality of points of contact are returned from the server 70, the caller selects the preferred point of contact to use in attempting to establish a communication session. Here, the requestor unit 40 generates a selection message indicating the different preferred points of contact returned by the server 70. The message is sent to the initiating device for presenting the selection choices to the caller. This presentation can be in the form of displaying an icon or short message for each point of contact selection choice. So as not to disclose the subscriber's preferred point of contact data, the selection message sent to the initiating device does not contain the point of contact information, but instead contains only indicators of the point of contact information. For example, the indicators in the selection message could cause the initiating unit to display three selection items, each relating to a different point of contact, such as "Washington, D.C. fax", "New York fax" and "Chicago fax". The caller selects one of those selection items, "Washington, D.C. fax", for example, as the point of contact to which to send a facsimile. The initiating device returns to the requester unit a selection message containing an indicator of the selected point of contact. The requester unit receives that selection message, recognizes that the "Washington, D.C. fax" indicator was selected, and attempts to establish a communication session using the point of contact information it had previously received from the server that corresponds to the subscriber's Washington, D.C. facsimile point of contact.

The requestor unit and initiating device can be programmed to use various permutations of these point of contact selection techniques, such as allowing the caller to select a plurality of the presented points of contacts for simultaneously attempting to establish a plurality of communication sessions.

It will be understood that the invention can be practiced using computer programmable devices, and with using hardware and/or software designed to operate according to the descriptions here.

Having described preferred embodiments of universal point of contact systems and methods, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of contacting a person who has a universal point of contact identifier, comprising:
    receiving, by an initiating device, an input of the person's universal point of contact identifier;
    presenting, in response to receiving the universal point of contact identifier, a first type of communication for contacting the person and a second type of communication for contacting the person;
    receiving a selection input of one of the first type of communication and the second type of communication; and
    contacting the person by the selected one of the first type of communication and the second type of communication at a preferred point of contact associated with the selected one of the first type of communication and the second type of communication,
    wherein one of the first type of communication and the second type of communication is voice communication, and the other of the first type of communication and the second type of communication is communication other than voice communication.

2. The method of claim 1, wherein the contacting comprises automatically establishing a communication session between the initiating device and the preferred point of contact associated with the selected one of the first type of communication and the second type of communication.

3. The method of claim 1, wherein the selected one of the first type of communication and the second type of communication is the communication other than the voice communication, and
    wherein the contacting comprises presenting a mailing address corresponding to the selected one of the first type of communication and the second type of communication, and delivering a package to the mailing address.

4. The method of claim 1, wherein the universal point of contact identifier is an email address.

5. The method of claim 4, wherein the email address consists of a user identification portion, a domain name portion and a demarcation symbol between the user identification and domain name portions.

6. The method of claim 5, wherein the email address is of the form userid@domainname, wherein userid is the user identification portion which is an identifier for the person within a computing domain having the domain name portion designated by domainname.

7. A non-transitory computer-readable medium having embodied thereon a computer program, the computer program enabling the contacting of a person who has a universal point of contact identifier, the computer program comprising:
    program code for receiving an input of the person's universal point of contact identifier into an initiating device;
    program code for presenting, in response to receiving the universal point of contact identifier, a first type of communication and a second type of communication for contacting the person;
    program code for receiving a selection input one of the first type of communication and the second type of communication; and
    program code for contacting the person by the selected one of the first type of communication and the second type of communication at a preferred point of contact associated with the selected one of the first type of communication and the second type of communication,
    wherein one of the first type of communication and the second type of communication is voice communication, and the other of the first type of communication and the second type of communication is communication other than voice communication.

8. The non-transitory computer-readable medium of claim 7, wherein the contacting comprises automatically establishing a communication session between the initiating device and the preferred point of contact associated with the selected one of the first type of communication and the second type of communication.

9. The non-transitory computer-readable medium of claim 7, wherein the selected one of the first type of communication and the second type of communication is the communication other than the voice communication, and
    wherein the contacting comprises presenting a mailing address corresponding to the selected one of the first type of communication and the second type of communication, and delivering a package to the mailing address.

10. The non-transitory computer-readable medium of claim 7, wherein the universal point of contact identifier is an email address.

11. The non-transitory computer-readable medium of claim 10, wherein the email address consists of a user identification portion, a domain name portion and a demarcation symbol between the user identification and domain name portions.

12. The non-transitory computer-readable medium of claim 11, wherein the email address is of the form userid@domainname, wherein userid is the user identification portion which is an identifier for the person within a computing domain having the domain name portion designated by domainname.

13. The method of claim 1, wherein the communication other than voice communication comprises one of fax communication, email communication, and postal communication.

14. The method of claim 1, wherein the contacting comprises:
   determining, from among a first point of contact that is associated with the selected one of the first type of communication and the second type of communication and a second point of contact associated with the selected one of the first type of communication and the second type of communication, one of the first point of contact and the second point of contact as the preferred point of contact; and
   contacting the person by the selected one of the first type of communication and the second type of communication at the preferred point of contact.

15. The method of claim 14, wherein the determining the one of the first point of contact and the second point of contact comprises determining the one of the first point of contact and the second point of contact based on at least one of a time of day at which the input of the person's universal point of contact identifier is received, a day of a week at which the input of the person's universal point of contact identifier is received, and an identity of a user of the initiating device.

16. The non-transitory computer-readable medium of claim 7, wherein the communication other than voice communication comprises one of fax communication, email communication, and postal communication.

17. The non-transitory computer-readable medium of claim 7, wherein the contacting comprises:
   determining, from among a first point of contact that is associated with the selected one of the first type of communication and the second type of communication and a second point of contact associated with the selected one of the first type of communication and the second type of communication, one of the first point of contact and the second point of contact as the preferred point of contact; and
   contacting the person by the selected one of the first type of communication and the second type of communication at the preferred point of contact.

18. The non-transitory computer-readable medium of claim 17, wherein the determining the one of the first point of contact and the second point of contact comprises determining the one of the first point of contact and the second point of contact based on at least one of a time of day at which the input of the person's universal point of contact identifier is received, a day of a week at which the input of the person's universal point of contact identifier is received, and an identity of a user of the initiating device.

19. A method of establishing a communication session between an initiating device of an initiating user and a preferred destination device of a recipient user, the method comprising:
   receiving, by the initiating device, from the initiating user an input of a universal point of contact identifier associated with the recipient user;
   receiving, by the initiating device, from among a first point of contact that is associated with the universal point of contact identifier and a first destination device of the recipient user and a second point of contact that is associated with the universal point of contact identifier and a second destination device of the recipient user, one of the first point of contact and the second point of contact, based on a preference of the recipient user that identifies one of the first destination device and the second destination device associated with the one of the first point of contact and the second point of contact as the preferred destination device; and
   establishing, by the initiating device, the communication session between the initiating device and the preferred destination device based on the received one of the first point of contact and the second point of contact.

20. The method of claim 19, wherein the universal point of contact identifier is an electronic mail address of the recipient user.

21. The method of claim 19, wherein the universal point of contact identifier is a unique identifier associated with the recipient user.

22. The method of claim 19, wherein the first point of contact is a first telephone number of the first destination device and the second point of contact is a second telephone number of the second destination device.

23. The method of claim 19, wherein the preference is a time of day at which the communication session is initiated.

24. The method of claim 19, wherein the preference is a day of the week at which the communication session is initiated.

25. The method of claim 19, wherein the preference is an identity of the initiating user.

26. A method of establishing a communication session between an initiating device of an initiating user and a preferred destination device of a recipient user, the method comprising:
   receiving, by a requestor unit through a network interface unit of the requestor unit, from the initiating device an input of a universal point of contact identifier associated with the recipient user;
   determining, from among a first point of contact that is associated with the universal point of contact identifier and a first destination device of the recipient user and a second point of contact that is associated with the universal point of contact identifier and a second destination device of the recipient user, one of the first point of contact and the second point of contact, based on a preference of the recipient user that identifies one of the first destination device and the second destination device associated with the one of the first point of contact and the second point of contact as the preferred destination device; and
   establishing the communication session between the initiating device and the preferred destination device based on the received one of the first point of contact and the second point of contact.

27. The method of claim 26, wherein the universal point of contact identifier is an electronic mail address of the recipient user.

28. The method of claim 26, wherein the universal point of contact identifier is a unique identifier associated with the recipient user.

29. The method of claim 26, wherein the first point of contact is a first telephone number of the first destination device and the second point of contact is a second telephone number of the second destination device.

30. The method of claim 26, wherein the preference is a time of day at which the communication session is initiated.

31. The method of claim 26, wherein the preference is a day of the week at which the communication session is initiated.

32. The method of claim 26, wherein the preference is an identity of the initiating user.

33. The method of claim 26, wherein the requestor unit comprises a storage unit that stores routing information for determining the preferred destination device.

34. A communication device that establishes a communication session between the communication device and a preferred destination device of a recipient user comprising:
   an input unit that receives from an initiating user an input of a universal point of contact identifier associated with the recipient user; and
   a communication unit that receives, from among a first point of contact that is associated with the universal point of contact identifier and a first destination device of the recipient user and a second point of contact that is associated with the universal point of contact identifier and a second destination device of the recipient user, one of the first point of contact and the second point of contact, based on a preference of the recipient user that identifies one of the first destination device and the second destination device associated with the one of the first point of contact and the second point of contact as the preferred destination device, and establishes the communication session between the communication device and the preferred destination device based on the received one of the first point of contact and the second point of contact.

35. The communication device of claim 34, wherein the communication device is one of a telephone and a facsimile machine.

36. The communication device of claim 35, wherein the communication device is the telephone and the input device comprises a keyboard.

37. A communication device for establishing a communication session between an initiating device of an initiating user and a preferred destination device of a recipient user comprising:
   a network interface unit that receives, from the initiating device an input of a universal point of contact identifier associated with the recipient user; and
   a control unit that determines from among a first point of contact that is associated with the universal point of contact identifier and a first destination device of the recipient user and a second point of contact that is associated with the universal point of contact identifier and a second destination device of the recipient user, one of the first point of contact and the second point of contact, based on a preference of the recipient user that identifies one of the first destination device and the second destination device associated with the one of the first point of contact and the second point of contact as the preferred destination device.

38. The communication device of claim 37, wherein the network interface unit transmits, to the initiating device, the one of the first point of contact and the second point of contact associated with the preferred destination device.

39. The method of claim 37, wherein the preference is a time of day at which the communication session is initiated.

40. The method of claim 37, wherein the preference is a day of the week at which the communication session is initiated.

41. The method of claim 37, wherein the preference is an identity of the initiating user.

42. The method of claim 37, wherein the preference of the recipient user is a selection by the recipient user that identifies the one of the first destination device and the second destination device associated with the one of the first point of contact and the second point of contact as the preferred destination device.

* * * * *